T. SWAN.
VEHICLE TOP.
APPLICATION FILED MAY 12, 1913.

1,173,154.

Patented Feb. 22, 1916.
4 SHEETS—SHEET 1.

Witnesses =
R. L. Bruck.
Brennan B. West

Inventor
Thomas Swan
By Hull & Smith,
Attys.

T. SWAN.
VEHICLE TOP.
APPLICATION FILED MAY 12, 1913.

1,173,154.

Patented Feb. 22, 1916.
4 SHEETS—SHEET 4.

Witnesses =
R. L. Bruck.
Brennan B. West

Inventor.
Thomas Swan,
By Hull & Smith,
Atty's.

UNITED STATES PATENT OFFICE.

THOMAS SWAN, OF CLEVELAND, OHIO, ASSIGNOR TO FISHER CLOSED BODY COMPANY, OF DETROIT, MICHIGAN, A CORPORATION OF MICHIGAN.

VEHICLE-TOP.

1,173,154.     Specification of Letters Patent.     Patented Feb. 22, 1916.

Application filed May 12, 1913. Serial No. 766,973.

*To all whom it may concern:*

Be it known that I, THOMAS SWAN, a citizen of the United States, residing at Cleveland, in the county of Cuyahoga and State of Ohio, have invented a certain new and useful Improvement in Vehicle-Tops, of which the following is a full, clear, and exact description, reference being had to the accompanying drawings.

This invention relates to tops for automobile bodies.

While certain features of construction are of more general application, the various features of the invention set forth herein are adaptable for a coupé or limousine top of the demountable type, and more especially to a top of the "knock-down" variety, the component parts of which may be conveniently assembled and applied to the coöperating parts of the body and may also be conveniently disassembled and packed away in a box or other receptacle for facility of storage.

Among the general objects which my invention is intended to secure are the following: (*a*) flexibility, enabling the demountable top to be applied to all bodies of a particular type or model without the necessity for making any changes or alterations in the equipment of the top or in the body irons or other parts with which such type of body is provided; (*b*), simplicity of construction, whereby a top of this kind may be produced at a cost which will insure a wide market and which top can be assembled and disassembled without the necessity for especially skilled labor; (*c*) efficiency in construction and operation whereby a top possessing the foregoing advantages is adaptable to all the ordinary incidents of use; (*d*) another very important feature of my demountable top is the latch operating device which is attached to the demountable top or housing and is adapted to operate the latch lever on the inside of the door.

I accomplish the foregoing and other objects to be set forth hereinafter by the construction illustrated in the drawings accompanying and forming part hereof, wherein—

Fig. 11 a side elevation of a vehicle of the touring car type having a limousine top of my invention applied thereto; Fig. 12 a detail in elevation; Fig. 13 a detail in section, and Fig. 14 a bottom plan view of the connection between the detachable top and one of the body irons of the car shown in Fig. 11.

In carrying out my invention, it is designed that the top shall be applied to and largely supported from the so called "body irons" with which the bodies of cars are usually equipped, such body irons serving to support the light canopy type of top which is employed in mild or summer weather. While these irons are applied to approximately the same parts of all bodies of the same model, there is, nevertheless, some variation in the distances therebetween. One of the objects of this invention is to so construct the coöperating parts of my coupé or limousine type of top as to enable it to be applied to any of the bodies of a certain type or model and to accommodate these differences in the location of the body irons. In the construction illustrated herein this result is secured by providing the bottoms of the side panels with reinforcing irons (the term "iron" in this connection being herein used generically to indicate a reinforcing and supporting device of rigid material), the said panels being connected to and supported from the body irons by the said bottom irons and the said bottom irons being provided with slots whereby they may be bolted or otherwise suitably secured to the body irons, the slots being of sufficient length to accommodate the variations in position of the body irons on various bodies of the same model.

Describing by reference characters the various parts illustrated herein, 1 denotes the body of a vehicle, the body in this instance being the body of a roadster or two-passenger vehicle. This body is shown as provided with a door 2 on the right hand side thereof, the steering wheel 3 being on the left hand side, as is now customary. At the front of the body there is provided a dash board 4, while the portion of the body at the rear of and adjacent to the door 2 is provided with a "body iron" 5 having a threaded end 6 and projecting laterally outwardly from the body and adapted to receive a thimble or eye at the lower end of the frame for the light or summer top. The opposite side of the body is provided with a similar iron, similarly located.

Figures 5, 6:
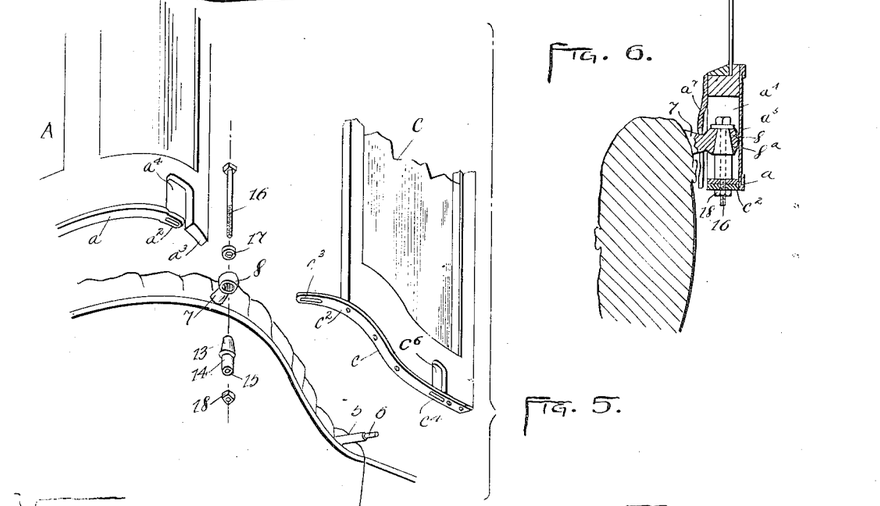
Fig. 5 a detail in perspective illustrating the manner in which the rear end of a side panel and the front end of the rear panel are connected together and are also connected to and supported by one of the body irons, the parts being separated.
Fig. 6 a detail in section showing the said parts in connected relation.

At each side of the back, the body is provided with another body iron 7 having a socket 8 at its outer end, the socket being provided with a tapered bore $8^a$ (see Fig. 6) which is adapted to receive the correspondingly tapered part of the ordinary top frame. Two irons 7 will be provided, located on opposite sides of the back. While the location of the irons 5 and 7 is substantially the same in all bodies of the same model, there is sufficient variation in this location to make it necessary to provide a certain degree of flexibility in the matter of the attachment between the demountable top and such irons. In the construction illustrated herein, this flexibility is secured in the following manner: A rear panel A, the side panel B and the side panel C are each provided at the bottom with the reinforcing strap or "iron" referred to hereinbefore. The iron $a$ for the bottom of the back panel A is a strap which extends beneath and is secured to the bottom of said panel and is provided with forwardly curved ends $a'$ each having at its end an elongated slot $a^2$. The iron $a$ does not extend quite to the ends of the panel A thereabove, the lateral ends of the back panel overhanging and projecting beyond the ends of the strap, as shown at $a^3$, for a purpose to be explained hereinafter. The bottom of the side panel B is provided with an iron the rear portion $b$ whereof is a comparatively narrow strap and the front portion $b'$ whereof is of considerably greater width than the rear portion, for a purpose to be explained. The strap $b$ has its rear end curved, as shown at $b^2$, to correspond to the curvature of the rear end of the side panel thereabove, and is provided at its end with an elongated slot $b^3$. Adjacent to the junction of the parts $b$ and $b'$, an elongated slot $b^4$ is provided. The panel B differs from the panels C, C', $C^2$ in that the three last-mentioned panels jointly constitute a side panel the parts whereof are separable whereas the panel B is in one piece. One of these side panels C corresponds to the rear portion of the panel B and is provided thereneath with the iron $c$ which is identical with the iron $b$, being provided with a curved end portion $c^2$ and an elongated slot $c^3$ at the rear end thereof and an elongated slot $c^4$ near the front end thereof.

The door panel C' of the demountable housing corresponds in width to the door 2 of the body and is carried thereby. For the purpose of securing it to the door body, it is provided at the bottom with an inwardly projecting ledge $c'$, the body of this ledge being preferably protected by metal.

Figure 2:
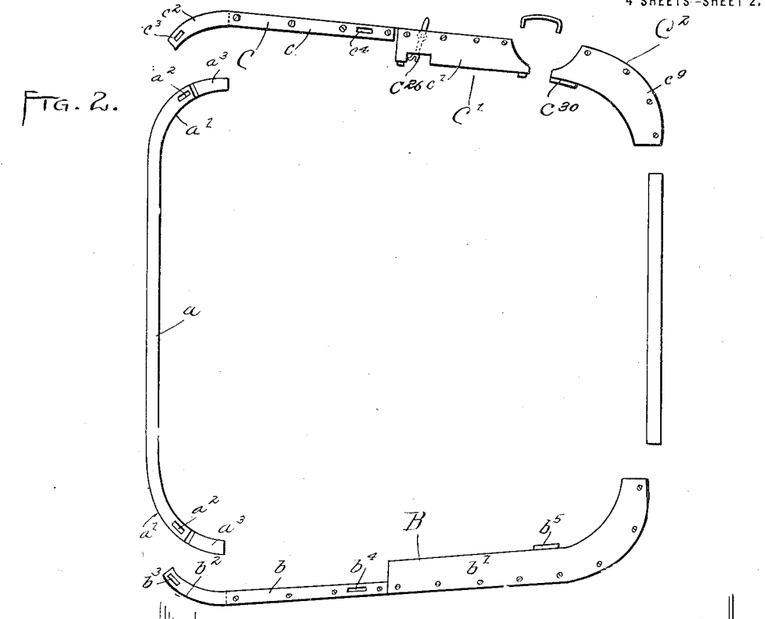
Fig. 2 a bottom plan view of the separable panels or sections of the demountable top.
Figures 7, 8:
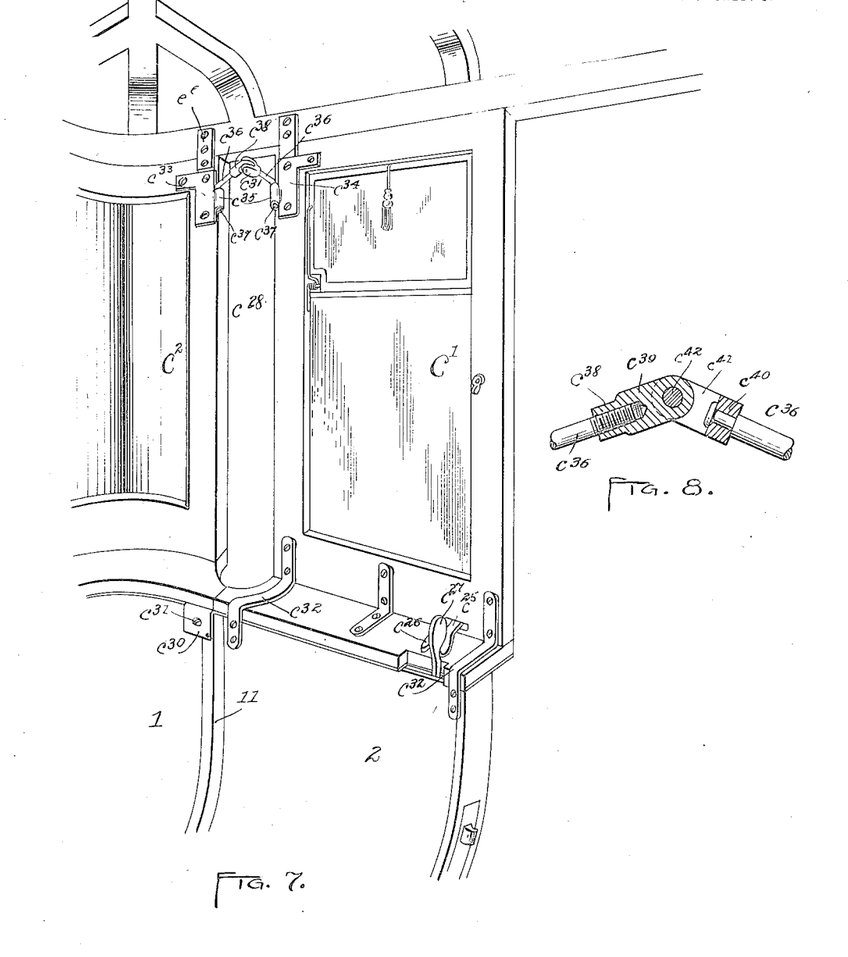
Fig. 7 a perspective view of the door panel, showing the manner in which this panel is applied to an adjacent panel and to the door of the vehicle.
Fig. 8 a sectional detail through the hinge connection between the door panel and the adjacent panel.

Near its lower end, the panel C' is provided with the door opening lever or latch operating means $c^{25}$. This lever or latch operating means is provided at its inner end with a fork $c^{26}$ which is adapted to engage the latch lever $c^{27}$ projecting upwardly from the door 2 (see Figs. 2 and 7). This lever $c^{25}$ is pivoted to the demountable housing in a slot therein to swing in a horizontal plane as shown in Fig. 2. It will be seen that this latch operating means is removable from the inside latch lever when the demountable housing or top is removed as the latch operating means engages the latch lever $c^{27}$ only by means of the forked end $c^{26}$ of the latch operating means $c^{25}$ straddling the top of the latch lever $c^{27}$. This latch operating means $c^{25}$ therefore makes a very convenient way of operating the inside latch levers which are quite generally used on open automobile bodies. This does away with the necessity of having a latch lever on the outside of the lower door panel as has been customary heretofore with bodies upon which a demountable housing has been mounted. Owing to the curvature of the door 2 and the location and construction of the hinges 9, it will be necessary to leave a space between the front of the door panel C' and the rear of the panel $C^2$, as will be hereinafter explained, and this space is provided with a pliable covering $C^{28}$ which is fastened to the panels C' and $C^2$ in any convenient manner.

The panels C' and $C^2$ are each provided at its bottom with an inwardly directed ledge having a reinforcing iron $c^{29}$ at its bottom. These ledges and the ledge at the bottom of the section B which is covered by the iron $b'$ support the sections $C'$ and $C^2$ on the top of the door 2 and on the top of the side panel 1 of the body, while the ledge provided with the iron $b$ supports the front of the side panel B from the front of the corresponding side of the body 1.

The iron plates at the bottoms of the inwardly projecting ledges are provided with downwardly extending lugs $b^5$ and $c^{30}$, respectively which project within the top of the body 1 and may be secured to the ribs 11 thereof, as by means of screws, one of which is indicated at $c^{31}$. The door $C'$ may be fastened to the door 2 by means of angular straps $c^{32}$.

Owing to the curvature of the door 2, the opening of this door and of the door panel $C'$ attached thereto will produce a vertical movement of the said door panel as well as a movement toward the panel $C^2$. In order to accommodate this movement, I provide a special form of hinge, shown in Figs. 7 and 8. $c^{33}$ and $c^{34}$ denote a pair of hinge butts applied to the adjacent edges of the panel $C^2$ and of the door panel $C'$, respectively. Each hinge butt is provided with a vertically extending socket $c^{35}$ projecting into the space between the opposed edges of the panels $C'$ and $C^2$. $c^{36}$ denotes a pair of angularly arranged rods each having a down turned end $c^{37}$ inserted into the socket $c^{35}$. The upper ends of these rods project inwardly and toward each other. One of them is provided with a body $c^{38}$ threaded onto its end and having a lug $c^{39}$. The other is provided with a body $c^{40}$ swiveled to the end thereof and having a pair of lugs $c^{41}$ adapted to receive therebetween the lug $c^{39}$ (see Figs. 7 and 8). These lugs are pivotally connected by means of a pin $c^{42}$. By this construction, there are five points of pivotal connection between the upper end of the door panel $C'$ and the upper end of the panel $C^2$, these pivotal points being provided between the downwardly bent ends $c^{37}$ of the rods $c^{36}$ and the sleeves $c^{38}$, between each of the bodies $c^{38}$ and $c^{40}$ and the corresponding end of its rod, and between the lugs of said bodies. By this pivotal connection, an efficient hinge connection is provided between the upper ends of the door panel $C'$ and the side panel $C^2$, which connection accommodates the peculiar movements of the door and at the same time unites the same firmly with the section $C^2$.

In addition to the panels described, the top is provided with a front panel D which may be conveniently supported from the dash board by means of straps 12 which may depend therefrom and be detachably secured to the front and rear bases of the dashboard, as by means of screws. The panel D may be divided transversely to provide a door $d$ at its upper end, the lower end of the door being adapted to swing outwardly and inwardly. Braces $d'$ may be provided to support this door in its outwardly swung or open position.

Figure 1:
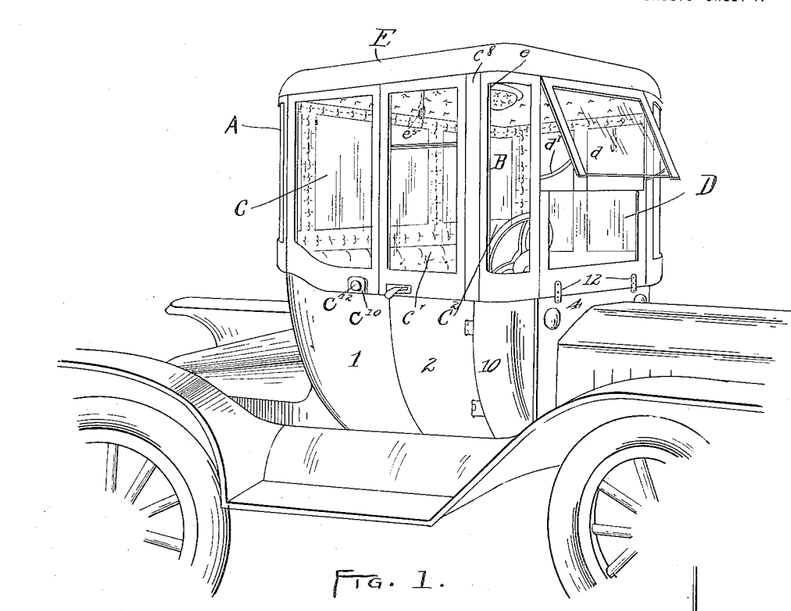
Figure 1 represents a perspective view of a body of an automobile having my demountable top thereon, the top being of the coupé type.
Figure 9:
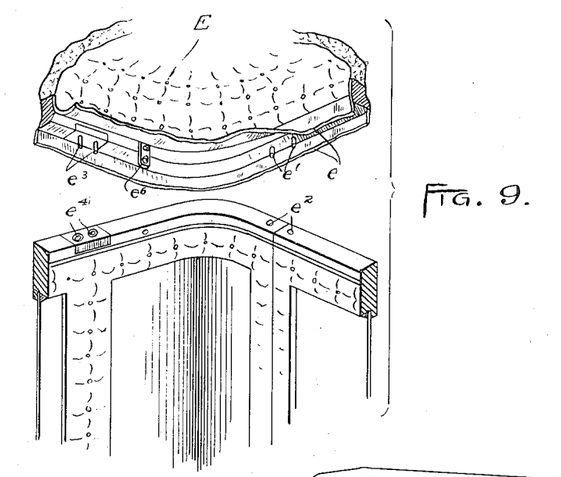
Fig. 9 a detail in perspective illustrating the connection between the cover and the vertical panels of the top, the parts being separated.
Figure 10:
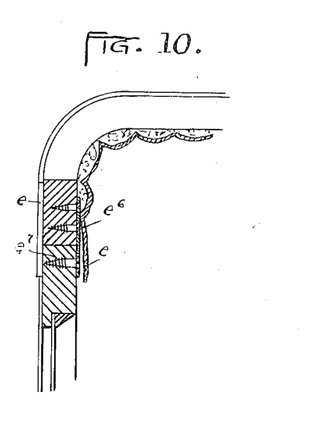
Fig. 10 a detail in section of a connection between the cover and one of the vertical panels of the top.

E denotes a cover which may be applied to the tops of the panels A, D, inclusive, to complete the demountable top. The cover E is conveniently applied to the tops of the various panels and is provided at its inner and its outer edge with a skirt $e$, which skirts surround the upper ends of the panels. This cover section is provided, within the skirts, with dowel pins $e'$ adapted to enter apertures $e^2$ at the upper ends of the said panels (see Fig. 9). Certain of these pins $e^3$ are intended to conduct current from a suitable source through coöperating conductor sockets $e^4$ to supply the lamp $e^5$ (see Figs. 9 and 1). In addition to the dowel pins, suitable straps $e^6$ depend from the cover E and may be secured to the upper inner edges of the body panels by means of screws $e^7$, said straps being covered by the inner skirt $e$ (see Figs. 7, 9 and 10).

In applying the panels of the top to the body, the lower end of the rear panel A telescopes closely over the upper end of the rear of the body. With the construction and arrangement of body irons as illustrated herein, the ends of the iron straps $a$ are brought beneath the sockets 8 at the ends of the body irons 7. The side panels B and C are also applied to the top of the body with the rear ends of the irons $b$ and $c$ beneath the sockets 8 and with the slots $c^3$ beneath the slots $a^2$. With the type and location of irons shown in Figs. 5 and 6, it is desirable to suspend the bottoms of the back and side panels at some distance below said irons. For this purpose, I insert a bushing into the socket 8, said bushing having a frusto-conical upper end 13, which is adapted to enter and fit the tapered socket $8^a$, and a cylindrical lower end 14. This bushing is provided with a bore 15 which is adapted to receive a standard bolt 16. This bolt is inserted through a washer 17, through the bushing, and through the slots $a^2$, $c^3$ (or $b^3$, as the case may be) and the nut 18 is set up to clamp the parts in place. Near each end, the rear panel A is provided with an upwardly projecting pocket $a^4$ which is adapted to receive the iron 7 therewithin, the pocket being closed by means of plates $a^5$ and $a^7$, preferably of sheet metal, detachably secured to opposite sides thereof.

Figures 3, 4:
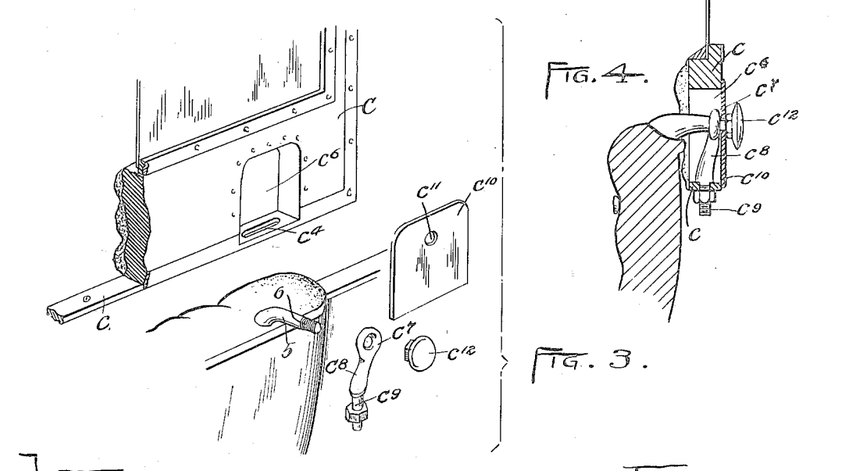
Fig. 3 a detail in perspective illustrating the connections between one of the side sections or panels and one of the body irons with which the vehicle body is provided, the parts being separated.
Fig. 4 a sectional detail showing the arrangement of the foregoing parts when connected.

The front of the panel C and the rear portion of the panel B are supported from the irons 5 in the manner shown more particularly in Figs. 3 and 4. The panel C will be selected for purposes of illustration, it being evident that the description of the selected portion of this panel will apply equally well to the panel B. The panel C is shown as provided with a pocket $c^6$ immediately above the slot $c^4$ in the strap $c$. The body iron or "goose-neck" 5 projects through the pocket $c^6$ and through the eye $c^7$ of a bolt $c^8$ having a threaded shank $c^9$ projecting through the slot $c^4$. The slots $c^4$ and $b^4$ permit of such adjustment of the eye bolts $c^8$ as may be necessary to accommodate the variations that will occur in the location of the body irons 5 in different bodies of the same model. The pocket $c^6$ may be conveniently closed by means of a plate $c^{10}$ having an aperture $c^{11}$ whereby it may be slipped over the threaded end 6 of the body iron 5, the cover plate being retained in place by means of a cap $c^{12}$ threaded onto the end 6 and engaging the outer surface of this cover plate.

Figures 11, 12, 13, 14:
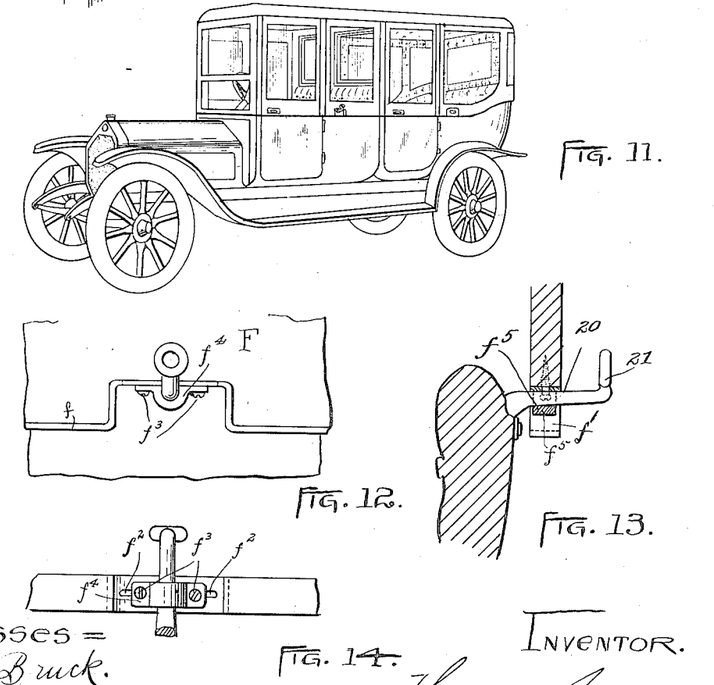

The demountable top as illustrated hereinbefore is of the coupé type and is provided with connections which are adapted for a certain type of body iron. In Fig. 11 I have shown a demountable top of the limousine type, which is applied to a larger body of the five or seven passenger type. Some of the body irons with which these larger vehicles are provided are so constructed and arranged as not to lend themselves to the style of connection illustrated in Figs. 3 and 4 and 5 and 6. Such iron, as illustrated in Figs. 13 and 14, comprises a bolt 20 projecting laterally from the top of the body and having its outer end directed upwardly and provided with an eye 21. With such an arrangement, it will be difficult to apply the form of connection shown in Figs. 3 and 4 and Figs. 5 and 6. Furthermore, it will be extremely inconvenient, if not impossible, to disassemble the top without breaking or injuring some of the connecting parts. For the purpose of preventing such action and to accommodate my demountable top construction to the iron shown herein, I provide the bottom of the corresponding top section or panel F with a strap $f$. The bottom of the panel F will be provided with an upwardly projecting recess or pocket $f'$, the top and side walls of which will be covered by the strap $f$. In the strap $f$ there is a pair of slots $f^2$ through which the bodies of screws $f^3$ may extend and which screws serve to secure a strap $f^4$ to the panel F. The strap $f^4$ is provided with a curved or recessed portion $f^5$ adapted to fit around the laterally projecting portion 20 of the body iron and thereby secure the panel F to said iron. When it is desired to remove this section, it is necessary only to remove the screws $f^3$, whereupon the section may be lifted from the iron 20.

By the constructions illustrated and described herein, it will be apparent that I have provided a demountable top which possesses the requisites of flexibility, ease of assembling and disassembling, cheapness of construction, and efficiency of operation that will accommodate it for all ordinary incidents of use in connection with bodies of the same model. While I have necessarily described my invention in detail, I do not propose to be limited thereby to such details of construction except as such limitation may be rendered necessary by the prior state of the art.

Having thus described my invention, what I claim is:—

1. The combination of a vehicle body, body irons carried thereby, a demountable top the rear end whereof is adapted to telescope over the end of the body and having thereneath a metallic strap having slots therein, and means extending through said slots and connecting the said strap and the top to the body irons.

2. The combination of a vehicle body, body irons carried thereby, a demountable top comprising a rear panel or section and side panels or sections, said sections being provided with rigid straps therebeneath, and adjustable connections between said straps and said irons.

3. The combination of a vehicle body, body irons carried by the rear portion of said body, a top comprising a rear and side panels or sections, the said sections having reinforcing straps at their bottoms and the adjacent ends of the straps of the rear and side sections or panels being slotted, and means extending through such slots and connecting the straps and the sections supported thereby with the said irons.

4. The combination, with a vehicle body iron, of a demountable top comprising an end and a side section, the end section being provided with a reinforcing strap at its bottom having a slot in the end which is adjacent to the side section and the side section being provided with a reinforcing strap having a slot in the end which is presented toward the rear section, one of said straps terminating short of its section and the other strap projecting beyond its section, the section having the former strap being adapted to receive therebeneath the projecting end of the strap carried by the other section and having a pocket above the end of its strap for the reception of the body iron, means extending through the slotted portions of said straps and connecting the same to the body iron, and a cover for said pocket.

5. The combination, with a vehicle body iron, of a demountable top comprising an end and a side section, the end section being provided with a reinforcing strap at its bottom having an aperture in the end which is adjacent to the said section and the side section being provided with a reinforcing strap having an aperture in the end which is presented toward the rear section, one of said straps terminating short of its section and the other strap projecting beyond its section, the section having the former strap being adapted to receive therebeneath the projecting end of the strap carried by the other section and having a pocket above the end of its strap for the reception of the body iron, and means extending through the apertures of said straps and connecting the same to the body iron.

6. The combination of a vehicle body, body irons carried by the rear portion of said body, a demountable top comprising a rear section and side sections, the rear section being provided with a reinforcing strap therebeneath the ends of which terminate short of the ends of said section and said section being provided with upwardly extending pockets above such strap ends for the reception of the body irons and the side sections being provided each with a reinforcing strap therebeneath having an end projecting beyond its rear end, and means extending through the overlapping ends of the side and rear straps and securing the sections to the body irons.

7. The combination of a vehicle body, body irons carried by the rear portion of said body, a demountable top comprising a rear section and side sections, the rear section being provided with a reinforcing strap therebeneath the ends of which are slotted and terminate short of the ends of the rear section and being provided with upwardly extending pockets above such strap ends for the reception of the body irons and the side sections being provided each with a reinforcing strap therebeneath having a slotted end projecting beyond its rear end, means extending through the overlapping slotted ends of the side and rear straps and securing the sections to the body irons, and covers for said pockets.

8. The combination of a vehicle body, a body iron projecting from the said body and having a frusto conical or tapered bore therein, a demountable top having at its bottom a reinforcing strap provided with an aperture, a bushing having a frusto conical or tapered end adapted to be inserted into the tapered bore of the body iron, and a bolt extending through the bushing and through the aperture in the strap, and connecting said strap to the body iron.

9. The combination of a vehicle body, a body iron carried thereby and provided with a frusto conical or tapered bore, a demountable top comprising panels or sections each having at its bottom a reinforcing strap provided with an aperture, the apertured ends of the straps being arranged and adapted to overlap, a bushing having a tapered or frusto-conical upper end adapted to fit within the bore of the body iron, and a bolt extending through said bushing and through the apertures in the overlapping ends of the straps and suspending the straps and the top sections from the said body iron.

10. The combination of a vehicle body, a laterally projecting body iron at each side thereof and provided each with a threaded end, a demountable top having a reinforcing strap at the bottom of each side and a pocket above said strap adapted to receive the said iron, means connecting the strap at each side of the top with the iron in the pocket, and a cover for each of said pockets.

11. The combination of a vehicle body, a laterally projecting body iron carried thereby and provided with a threaded end, a demountable top having a reinforcing strap at the bottom thereof and a pocket above said strap adapted to receive the said iron, and means connecting the strap with the iron in the pocket.

12. The combination of a vehicle body, a laterally projecting iron provided with a threaded end, a demountable top for said body having therebeneath a reinforcing strap and provided above said strap with a pocket for the reception of the iron, said strap being slotted below the pocket, an eye-bolt applied to the iron in said pocket and having a shank projecting through the slot in the strap therebeneath, a nut for the shank of said eye-bolt, a plate for said pocket having an aperture for the threaded end of the body iron, and a clamping device for the said plate threaded onto the end of said iron.

13. The combination of a vehicle body, body irons carried by the rear and sides of said body, a demountable top comprising rear and side sections, said sections being provided each with a reinforcing strap therebeneath, adjustable means for securing the strap of the end section and the straps of the side sections to the rear body irons, and means for securing the straps of the side sections to the side body irons.

14. The combination of a vehicle body, a door in the side thereof, a demountable top comprising a rear end and sides, one of the sides consisting of a section adjacent to the rear section, a door section, and a front section, means for securing the door section to the body door, the door section being spaced from the adjacent front side section of the top, an extension hinge connecting the door section with such side section, and pliable material covering the space between the said door section and the front side section.

15. The combination of a vehicle body, a door in the side thereof, a demountable top comprising a rear end and sides, one of the sides consisting of a section adjacent to the rear section, a door section, and a front section, means for securing the door section to the body door, the door section being spaced from the adjacent front side section of the top, and an extension hinge connecting the door section with such side section.

16. The combination of a vehicle body, a door in the side thereof, a demountable top comprising a plurality of separable side sections or panels, one of the said side sections or panels constituting a vertical extension of the door and being secured to and carried by said door, the edge of said section which projects upwardly from the hinged side of the door being spaced from the edge of the adjacent side section, a hinge connecting the upper ends of the door section and the adjacent side section, said hinge comprising a pair of rods having vertical portions mounted in sockets carried by the adjacent edges of the door and side sections, a head threaded on the end of one of said rods and provided with a lug, a head swiveled on the end of the other rod and provided with a lug, a pintle extending through the lugs on said heads, and a cover of pliable material extending across the space between the adjacent edges of the door and side sections.

17. The combination of a vehicle body, a door in the side thereof, a demountable top comprising a plurality of separable side sections or panels, one of the said side sections or panels constituting a vertical extension of the door and being secured to and carried by said door, the edge of said section which projects upwardly from the hinged side of the door being spaced from the edge of the adjacent side section, and a hinge connecting the upper ends of the door section and the adjacent side section, said hinge comprising a pair of rods having vertical portions mounted in sockets carried by the adjacent edges of the door and side sections, a head rotatably mounted on the end of one of said rods, a head rotatably mounted on the end of the other rod, and a pivotal connection between said heads.

18. A demountable top comprising a plurality of vertical panels or sections, a cover for the tops of said sections, said cover being provided with dowel pins adapted to enter apertures in the upper ends of the sections, metallic straps secured to and depending from the cover and adapted to be secured to the upper ends of the said sections or panels, and a depending skirt carried by the cover and adapted to overhang said straps.

19. A demountable top comprising a plurality of vertical panels or sections, a cover for the tops of said sections, metallic straps secured to and depending from the cover and adapted to be secured to the upper ends of the said sections or panels, and a depending skirt carried by the cover and adapted to overhang said straps.

20. The combination of a vehicle body and a top removably secured thereto, the top embodying side and end walls, the former having door and window openings, canopy supporting irons projecting from the body, the walls of the top being provided with recesses opening through the lower edges thereof and adapted to receive the said irons for supporting the top, the recesses in the side wall being of a width somewhat greater than the size of the portions of the irons projecting thereinto, fastening means coöperating with the irons for securing the top removably in position, and provisions forming closures for the openings and encompassing the irons.

21. The combination of a vehicle body, and a top removably secured thereto, canopy supporting irons projecting from the body, the top embodying side and end walls having recesses opening through their lower edges to receive the said irons, said recesses being of a width somewhat greater than the portions of the said irons which project thereinto, closure plates for the recesses, said plates encompassing the respective irons, and fastening means coöperating with the irons for securing the top removably in position, the opening in the plates being of a size to closely fit the said irons and less than the width of the respective recesses.

22. The combination with an automobile body having a door equipped with a lock having an upwardly extending actuating arm, of a housing surmounting said body and equipped with a door surmounting said first-named door, and lock actuating means carried by said second-named door having connections with said arm and serving to actuate the lock of said first-named door through the medium of said arm.

23. The combination of a vehicle body provided with a door having an inside latch operating lever, a demountable top or housing provided with a door panel adapted to be connected with the door of the vehicle body, and latch operating means comprising a lever pivoted to the demountable top whose inside end is provided with a removable connection with said inside latch operating lever.

24. The combination with a vehicle body provided with a door having an inside latch operating lever, of a demountable top or housing provided with a door panel adapted to engage with the door of the vehicle body, and latch operating means comprising a lever pivoted to the door panel of said demountable housing and having a bifurcated inner end adapted to be removably engaged with the latch operating lever.

25. The combination with a vehicle body provided with a door having an inside latch operating lever, of a demountable top or housing having a door panel adapted to be attached to the door of the vehicle body, and latch operating means comprising a member adapted to oscillate with respect to the door panel of the demountable top and carried by such door panel, the said member having a detachable connection with the latch operating lever so that the said latch operating means may be removed with the demountable top.

In testimony whereof, I hereunto affix my signature in the presence of two witnesses.

THOMAS SWAN.

Witnesses:
J. B. HULL,
BRENNAN B. WEST.

Copies of this patent may be obtained for five cents each, by addressing the "Commissioner of Patents, Washington, D. C."